Patented May 6, 1930

1,757,176

UNITED STATES PATENT OFFICE

FITZGERALD DUNNING, OF BALTIMORE, MARYLAND, ASSIGNOR TO HYNSON, WESTCOTT & DUNNING, INC., OF BALTIMORE, MARYLAND, A CORPORATION OF MARYLAND

MERCURY DERIVATIVE OF DI-IODO RESORCIN SULFON-PHTHALEIN

No Drawing.  Application filed December 8, 1928.  Serial No. 324,809.

This invention relates to products which consist of hydroxy-mercuri derivatives of di-iodo resorcin sulfon-phthalein and are free of alkali metal salts, such as sodium acetate and sodium chloride, and of complex organic mercurials containing an acid radical bound to the mercury, such as acetoxy mercury derivatives and chlor-mercury derivatives, which alkali metal salts and complex organic mercurials are apt to be present in products made by customary mercuration methods using, for instance, mercuric acetate or mercuric chloride as the mercurating agent.

The products may be either mono-hydroxy mercuri or di-hydroxy-mercuri derivatives and either in the form of their insoluble free acids or in the form of their soluble alkali metal compounds and the alkali metal compounds may be either mono- or di-alkali metal compounds. Definite mono- and di-alkali metal compounds are obtainable from the free acids and conversely the free acids are obtainable from the alkali metal compounds as will appear hereinafter.

*Example 1.*—620 grams (1 mole) of di-iodo resorcin sulfon-phthalein is dissolved in 1 liter of hot normal aqueous sodium hydroxide solution; the resulting solution is diluted with 2 liters of water; 220 grams (approximately 1 mole) of mercuric oxide is added; the mixture is boiled under reflux until all of the mercuric oxide is dissolved; the solution is allowed to stand over night, filtered and the filtrate evaporated to dryness on a water bath or in vacuum. The product so obtained is essentially the mono-sodium compound of mono-hydroxy-mercuri di-iodo resorcin sulfon-phthalein. It is in the form of dark green scales with a metallic luster, which becomes a dark red-brown powder on pulverizing. It is readily soluble in water, giving a clear dull red solution. It dissolves clearly in ammonium sulphide, therefore no ionic mercury is present. Tests indicate the absence of any extraneous alkali metal salts, and analysis of the compound for mercury, iodine and sulphur shows that its composition corresponds very closely to the theoretical formula:

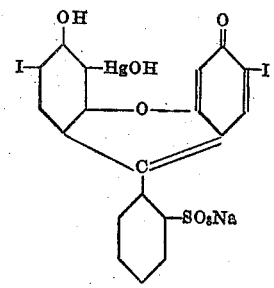

By using 1 liter of 2 normal aqueous sodium hydroxide solutions in the above example and then proceeding as directed, the di-sodium compound of mono-hydroxy-mercuri di-iodo resorcin sulfon-phthalein is obtained. This product differs but slightly in physical appearance from the mono-sodium compound. Its water solution has a slightly more purplish tint. Tests and analysis, as above, indicate that this compound has the probable formula:

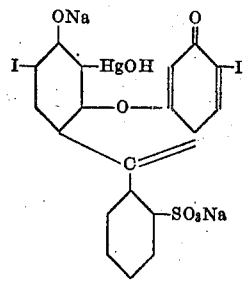

The free acid form can be obtained from these sodium compounds by cautious precipitation with a suitable amount of dilute hydrochloric acid. For example, pour a 5% to 10% water solution of the sodium compound at room or slightly elevated temperature, say 15° to 60° C., slowly and with rapid stirring into a body of $\frac{N}{10}$ aqueous hydro-chloric acid solution at about 60° C., said body containing hydrochloric acid in quantity chemically equivalent to or preferably slightly in excess of the sodium content of the compound or pour the hydrochloric acid solution slowly and with rapid stirring into the solution of the sodium compound, care being taken in this case that both solutions are warmed to about 60° C. The resulting precipitate in either case, being the free acid, is filtered, washed with water slightly acidified with HCl and dried. Practically quantitative yields are obtained. This free acid product dries as a dark brown powder with a slight greenish luster which disappears on pulverizing. Analysis shows it to have the probable formula:

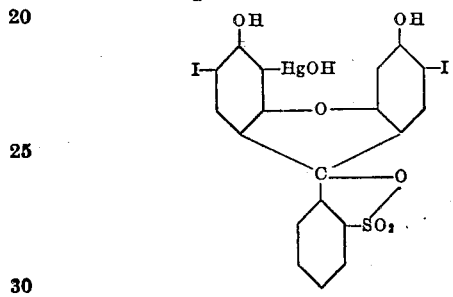

*Example 2.*—620 grams of di-iodo resorcin sulfon-phthalein is dissolved in 1 liter of hot normal aqueous sodium hydroxide solution; the resulting solution is diluted with 2 liters of water; 440 grams of mercuric oxide is added; the mixture is boiled under a reflux for several hours until there is only a very slight amount of mercuric oxide left; the reaction mixture is centrifuged and then filtered and the clear solution taken to dryness on a water bath or in vacuum. The product so obtained is in the form of green scale, having a slightly yellowish luster. On pulverizing it becomes a dark red-brown powder. Its water solution has a more purplish tint than the solution of the mono-sodium compound of mono hydroxy-mercuri di-iodo resorcin sulfon-phthalein. It dissolves clearly in ammonium sulphide; tests indicate the absence of extraneous alkali metal salts; and analysis of the compound for mercury, iodine, and sulphur shows that it corresponds to the formula:

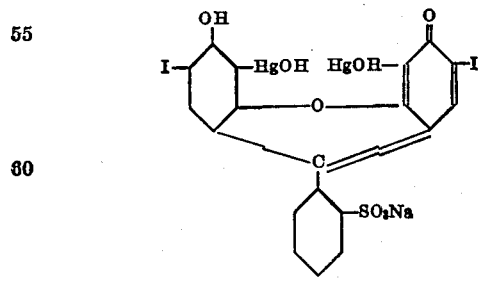

Therefore, it is essentially the mono-sodium compound of di-hydroxy-mercuri di-iodo resorcin sulfon-phthalein.

By using 1 liter of 2 normal aqueous sodium hydroxide solutions in the foregoing example the di-sodium compound of di-hydroxy-mercuri di-iodo resorcin sulfon-phthalein can be prepared.

The free acid can be obtained from these sodium compounds, by cautious precipitation with dilute hydro-chloric acid as described in Example 1. The mono and di-alkali metal compounds of the mono- and di-hydroxy-mercuri derivatives of the di-iodo resorcin sulfon-phthalein may be prepared from the corresponding free acids by dissolving them in the calculated quantity of caustic alkali solution, filtering and evaporating to dryness advantageously under reduced pressure.

These products have been found, by reason of their nature and unusual purity, to possess powerful bactericidal activity coupled with very low toxicity, and may be used generally in the treatment of infections.

I claim:

1. As a new product a hydroxy-mercuri derivative of di-iodo resorcin sulfon-phthalein, free of extraneous alkali metal salt, and complex organic mercurial containing an acid radical bound to mercury.

2. As a new product a water-soluble alkali metal compound of a hydroxy-mercuri derivative of di-iodo resorcin sulfon-phthalein, free of extraneous alkali metal salt, and complex organic mercurial containing an acid radical bound to mercury.

3. As a new product a water-soluble sodium compound of a hydroxy-mercuri derivative of di-iodo resorcin sulfon-phthalein, free of extraneous alkali metal salt, and complex organic mercurial containing an acid radical bound to mercury.

4. As a new product a mono-sodium compound of a hydroxy-mercuri derivative of di-iodo resorcin sulfon-phthalein, free of extraneous alkali metal salt, and complex organic mercurial containing an acid radical bound to mercury.

5. As a new product a mono-hydroxy-mercuri derivative of di-iodo resorcin sulfon phthalein, free of extraneous alkali metal salt, and complex organic mercurial containing an acid radical bound to mercury.

6. As a new product a water-soluble alkali metal compound of mono-hydroxy-mercuri di-iodo resorcin sulfon-phthalein, free of extraneous alkali metal salt, and complex organic mercurial containing an acid radical bound to mercury.

7. As a new product a sodium compound of mono-hydroxy-mercuri di-iodo resorcin sulfon-phthalein, free of extraneous alkali metal salt, and complex organic mercurial containing an acid radical bound to mercury.

8. As a new product the mono-sodium compound of mono-hydroxy-mercuri di-iodo resorcin sulfon-phthalein, free of extraneous alkali metal salt, and complex organic mercurial containing an acid radical bound to mercury.

In testimony whereof, I affix my signature.

FITZGERALD DUNNING.